UNITED STATES PATENT OFFICE.

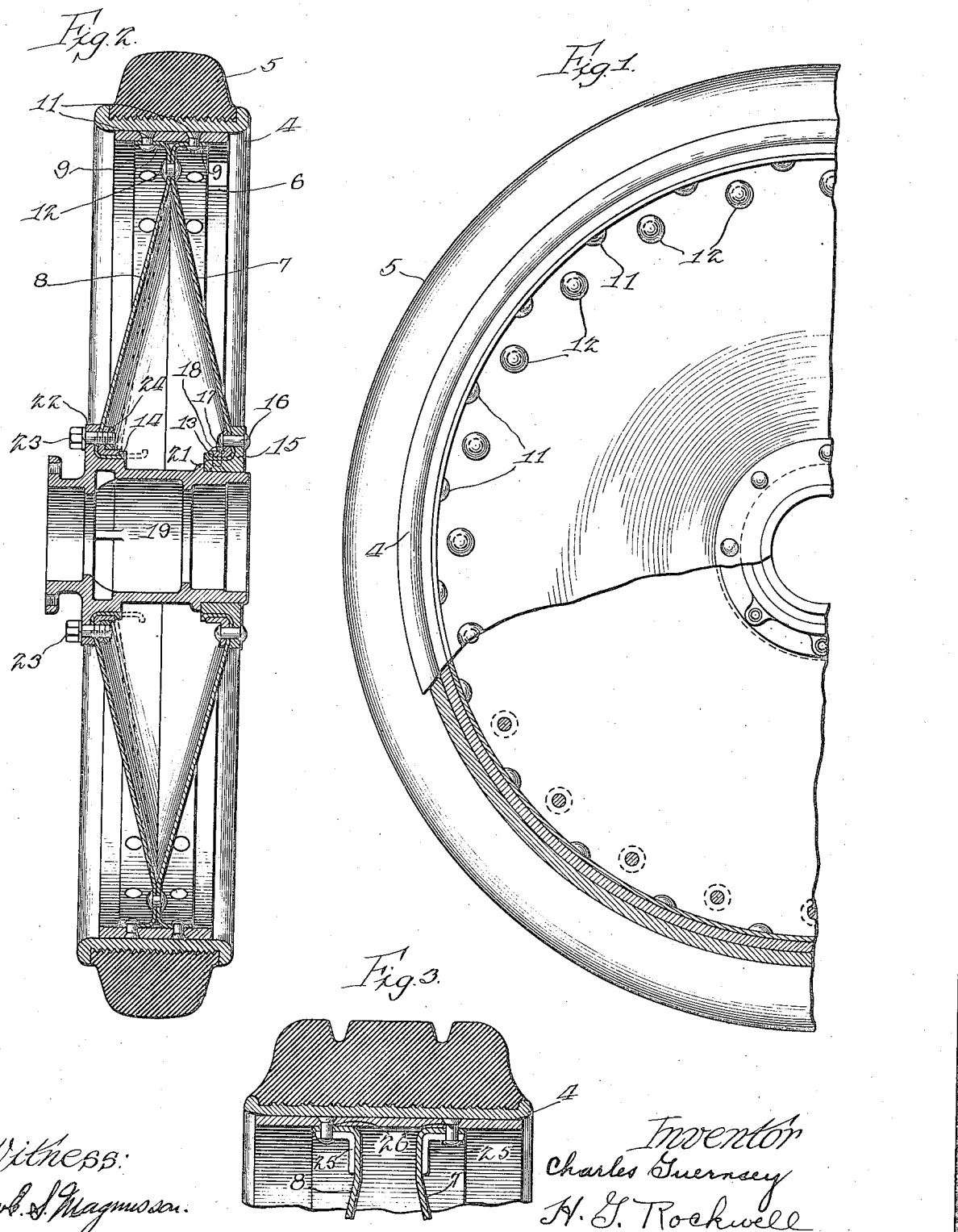

CHARLES GUERNSEY, OF WABASH, INDIANA.

WHEEL.

1,424,818.   Specification of Letters Patent.   Patented Aug. 8, 1922.

Application filed June 1, 1920. Serial No. 385,472.

*To all whom it may concern:*

Be it known that I, CHARLES GUERNSEY, a citizen of the United States, residing at Wabash, in the county of Wabash and State of Indiana, have invented certain new and useful Improvements in Wheels, of which the following is a specification.

This invention relates in general to wheel structures and more particularly to vehicle wheels for use on automobiles, motor trucks and the like, the invention being more specifically concerned with the structure of a metal wheel.

One of the primary objects of my invention is to provide a metal wheel of the character indicated which will be strong and durable but at the same time light in construction, one which can be cheaply manufactured, one which will conduct heat from the rim of the wheel thus tending to keep the tire cool, and one which will present a pleasant appearance and which can be easily assembled and disassembled when desired.

In wheels of this character it is desirable that the metal discs affording the connection between the hub and the rim be under tension rather than compression, so that the hub which carries the load is suspended from the rim similarly to the mode of operation of a wire wheel instead of being supported from beneath by members under compression between the hub and the rim as is the case in the ordinary wood wheels. One of the features of my invention therefore resides in the provision of a metal wheel which will accomplish the desideratum above mentioned and in which the metal discs are placed and maintained under tension by means of novel and simple structural features.

A further object of my invention is to provide a wheel of the character specified which shall be so constructed that the hub can be readily and easily removed from the wheel structure, or in other words the construction is such that the wheel proper may be removed from the hub so that in changing the wheel it becomes unnecessary to remove the hub from its spindle, the wheel itself being detached from the hub and removed and replaced by another.

Other objects and many of the inherent advantages of my invention will be readily appreciated as the same becomes better understood by reference to the following description when considered in connection with the accompanying drawings.

Referring to the drawings:

Fig. 1 is a fragmentary side elevation of a wheel embodying my invention, a portion thereof being broken away to more clearly illustrate the underlying structure.

Fig. 2 is a diametrical sectional view of the wheel illustrated in Fig. 1, and Fig. 3 is a fragmentary view of a modified form of my invention.

Referring now more specifically to the drawings, reference character 4 indicates generally the rim which may be of any well known or preferred form of construction, to which is applied the tire 5 of any preferred type either solid or pneumatic, a solid tire being shown for the purposes of illustration merely.

Within the rim proper there is disposed and securely attached thereto an auxiliary or inner rim 6 to which the perimeters of the metal discs 7 and 8, forming the load carrying connection between the wheel rim and the hub, are securely attached. The mode of attachment illustrated in Figs. 1 and 2 consists in providing the perimeters of the discs with laterally projecting flanges 9 which fit snugly within the rim member 6 to which they are permanently and rigidly secured by rivets 11. In this construction the contiguous circumferential marginal portions of the discs are securely connected together by a series of rivets 12. These discs are made with but little camber so that they diverge from their point of connection in practically straight lines, their inner edges being normally disposed more closely together than they are in the assembled wheel so that when these inner edges are spread apart it places the discs under tension, as will be later described.

The inner margins of the discs 7 and 8 are preferably bent toward each other to provide flanges 13 and 14 respectively, as shown in Fig. 2 and to the inner portion of the disc 7 there is rigidly attached an angle-shaped ring 15 by means of rivets 16 which pass through the ring and the disc and through an inner angle-shaped ring 17 so that the disc is rigidly secured to and clamped between the rings 15 and 17. Auxiliary rivets 18 extending radially through the rings and the flange 13 are preferably employed to lend strength and rigidity to the structure.

The hub of the wheel designated generally by reference character 19 may be inserted into position within the central openings of the discs from the left viewing Fig. 2, said hub being equipped near its outer end with a circumferential shoulder 21 adapted to abut against the inner edge of the ring 15 thereby limiting the protrusion of the hub through the ring. This shoulder, however, is of smaller diameter than the opening through the disc 8 so that the hub may be inserted into position without interference with this disc.

At its inner end the hub is equipped with a circumferential flange 22 adapted to overlap the inner margin of the disc 8 and to afford a seat against which the outer face of this disc may be snugly drawn by means of a series of cap screws 23 adapted to be projected through apertures in the flange 22 and in the disc 8, the inner ends of these screws being threaded into a ring 24 engaged with the inner face of the disc. This ring 24 may be loose if preferred but for convenience of assembly it may be riveted or welded to the disc 8 in proper position, with the threaded apertures alined with the corresponding openings in the disc 8 and properly spaced to register with the openings in the flange 22 so that the cap screws can be easily inserted and tightened up.

As previously stated the inner peripheries of the discs 7 and 8 are normally disposed more closely together than when attached to the hub and approximately the normal position of the discs is shown in Fig. 2, wherein the normal position of disc 8 is indicated by dotted lines. When, however, the inner edge of this disc is drawn toward and clamped against the flange 22 this disc and also disc 7 will be placed under tension and will be thus retained in the assembled wheel so that the hub will in effect be suspended from these discs as it is from the spokes of a wire wheel, instead of being supported from a point directly beneath the hub as is the case in wood wheels.

In this construction, therefore, the load is distributed throughout the upper portion of the wheel and is carried more evenly and flexibly than is possible with a direct rigid support or connection between the hub and the rim wherein the load on the hub is supported from beneath.

In larger sizes of wheels, instead of securing the peripheries of the discs to the rim in the manner illustrated in Fig. 2, I may employ the construction disclosed in Fig. 3 wherein it will be observed that the outer margins of the discs 7 and 8 are secured to the rim 4 in spaced relation, and instead of being riveted together to lend strength and rigidity to the structure, the discs are reenforced by angle irons 25, through which the holding rivets 26 pass, thus securely clamping the margins of the discs between the angle irons and the rims, and also affording a re-enforcement for the outwardly disposed margins of the discs.

It will be apparent from the foregoing that I have provided a wheel which is strong and durable in construction, one in which the metal discs are secured to the rim in close contact therewith so as to afford good heat conduction from the rim to facilitate cooling of the tire, one in which the connecting discs between the rim and the hub are under tension so as to distribute the load around the upper portion of the rim and carry the load on the hub with a considerable degree of resilience and flexibility, one which can be cheaply manufactured and readily assembled, and one in which the wheel proper may be easily detached and removed from the hub by simply taking out the cap screws 23. In changing a wheel, therefore, it is unnecessary to remove the hub from the spindle, but by simply unscrewing the cap screws the wheel proper, including the tire, rim and discs, will be detached from the hub so that it may be slipped off over the end of the hub and quickly replaced by another wheel when desired.

It is believed that my invention, its method of construction and many of its attendant advantages will be understood from the foregoing without further description, and while I have shown and described a preferred embodiment thereof, it will be manifest that the structural details shown and described are capable of considerable modification and variation without departing from the essence of the invention as set forth in the following claims.

I claim:

1. A vehicle wheel comprising a rim, a pair of discs secured thereto and provided with central openings, a ring secured to the inner periphery of one of said discs, a detachable hub adapted to be introduced through said disc openings, provided with a shoulder adapted to engage said ring and with a flange overlapping the inner margin of the other disc, and means co-operating with said flange to place said discs under tension.

2. A vehicle wheel comprising a rim, a pair of discs secured thereto, a ring secured to the inner margin of one of said discs, a hub provided with a circumferential shoulder adapted to engage said ring and with a circumferential flange adapted to engage the other disc, and means for drawing said last mentioned disc toward and anchoring the same to said flange so as to place both of said discs under tension.

3. A vehicle wheel comprising a rim, a pair of discs secured thereto, a ring secured to the inner margin of one of said discs, a hub detachable from said discs provided with a shoulder to engage said ring and with a flange to engage the other disc, and a plurality of cap screws whereby said last mentioned disc may be drawn toward and anchored to said flange.

4. In a vehicle wheel, the combination of a hub provided near its outer end with a circumferential shoulder and near its inner end with an annular flange of greater diameter than said shoulder, a rim, a plurality of discs attached thereto and provided with central openings, the opening of the inner disc being adaped to pass over said shoulder, a ring attached to the outer disc adapted to fit the outer end of said hub and abut against said shoulder, and means for drawing the inner disc toward and securing the same to said flange whereby to place the discs under tension and lock the same to said hub.

5. In a vehicle wheel, the combination of a rim, a pair of discs secured thereto and provided with central openings, a hub detachable from said discs having a flange adapted to overlap the inner disc and a shoulder adapted to pass through said inner disc, a ring secured to the outer disc and adapted to engage said shoulder, and means for drawing the inner disc toward and securing the same to said flange.

CHARLES GUERNSEY.